Oct. 4, 1966

G. ROMI 3,276,325

RACKBAR CUTTING MACHINE

Filed Dec. 15, 1965

INVENTOR.
Giordano Romi

BY

Michael J. Striker

Oct. 4, 1966

G. ROMI 3,276,325

RACKBAR CUTTING MACHINE

Filed Dec. 15, 1965

INVENTOR.
Giordano Romi
BY
Michael J. Striker
Atty

United States Patent Office 3,276,325
Patented Oct. 4, 1966

3,276,325
RACKBAR CUTTING MACHINE
Giordano Romi, Santa Barbara d'Oeste, Brazil
Filed Dec. 15, 1965, Ser. No. 514,017
Claims priority, application Brazil, June 27, 1957, 95,280
10 Claims. (Cl. 90—7)

The present application is a continuation-in-part application of my copending application Serial No. 278,017 filed May 6, 1963, now Patent No. 3,230,830, which is a divisional application of my application Serial No. 671,095, filed July 10, 1957, and issued as U.S. Patent 3,089,392.

The present invention relates to a rackbar cutting machine applying the new gear cutting principle disclosed in my U.S. Patent 3,089,392 to the cutting of rackbars. It is one object of the invention to provide a rackbar cutting machine of high efficiency which inexpensively cuts rackbars of high quality.

Another object of the invention is to provide a rackbar cutting machine of high productivity.

Another object of the invention is to provide a rackbar cutting machine capable of simultaneously cutting a plurality of rackbars.

Another object of the invention is to provide a rackbar cutting machine which uses the forward and return stroke of a reciprocating rotary cutter gear for cutting two different rackbars.

Another object of the invention is to provide a rackbar cutting machine in which a cylindrical rotary cutter gear cuts a rack blank in such a position that a clearance angle between the teeth of the cutter and the rackbar blank is provided.

With these objects in view, the present invention relates to a rackbar cutting machine in which a rackbar, or several rackbars, are simultaneously generated by rotary cutter gear meshing with rackbar blanks while cutting the same.

One embodiment of the invention comprises first and second supporting means movable relative to each other in a first direction and in a second direction perpendicular to the first direction; holding means mounted on the first support means for holding at least one rackbar blank; rotary cutter means mounted on the second supporting means for rotation about an axis extending in a third direction at an acute angle to the second direction; and operation control means for controlling the relative movement of the first and second supporting means, and of the cutter means.

A rackbar blank is mounted on the first supporting means extending in the first direction. For cutting a rackbar, the cutter is advanced in the third direction from an initial position to a cutting position engaging the blank. The first and second supporting means are then moved relative to each other in the second direction in a cutting stroke while moving relative to each other in the first direction with the rotary cutter and the rack blank meshing in generating engagement. Thereupon, the rotary cutter gear means is retracted in the third direction from the cutting position. By moving the first and second supporting means relative to each other in the second direction, the cutter is returned to its initial position. The rotary cutter and the rackbar blank perform a relative movement along a parallelogram.

In the preferred embodiment of the invention, the first supporting means are movable in the first direction relative to the second supporting means, and the second supporting means are movable in the second direction relative to the first supporting means.

Consequently, the cutting stroke and the return stroke of the cutter in the second direction are effected by movement of the second supporting means which preferably is a slide supporting the shaft of the cutter for rotation and for movement in the third direction with the cutter.

In accordance with the preferred embodiment of the invention, the return stroke of the cutter in the second direction is used for cutting another rackbar blank so that the output of the machine is doubled. Two rackbar blanks are mounted on opposite sides of the gear cutter on two supporting members or carriages of the first supporting means which are movable in the first direction to permit the meshing of the cutter with the generated rackbar blanks during the opposite cutting strokes in the second direction.

Operation control means are provided for moving in the required sequence, the first supporting means with the rackbar blank or blanks in the first direction, the second supporting means with the rotary cutter in the second direction, and the rotary cutter in the third direction.

The operation control means preferably include hydraulic cylinder and piston means for moving the slide of the second supporting means up and down in vertical direction, other hydraulic cylinder and piston means for moving the shaft of the rotary cutter in the third direction at an acute angle to the vertical direction, and a valve controlling the reciprocating motions of the respective pistons. The operation control means also include an electric motor driving through a suitable transmission the shaft of the cutter, and the carriage or carriages supporting the rackbar blanks in horizontal direction as required by the generating meshing engagement between the rotary cutter and the rackbar blanks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
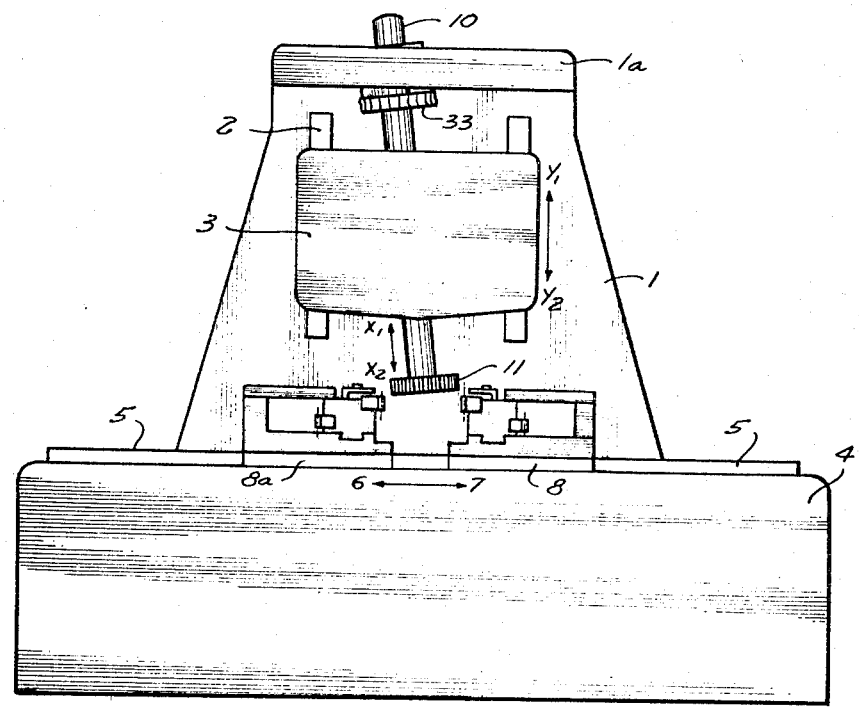
FIG. 1 is a front view of a rackbar cutting machine according to the invention.
Figure 2:
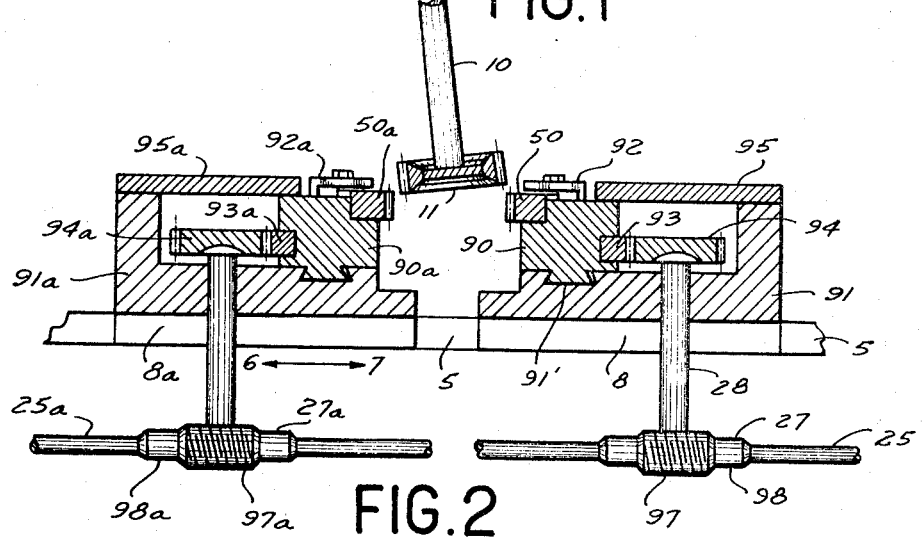
FIG. 2 is a vertical sectional view illustrating a detail of the embodiment of FIG. 1.
Figure 3:
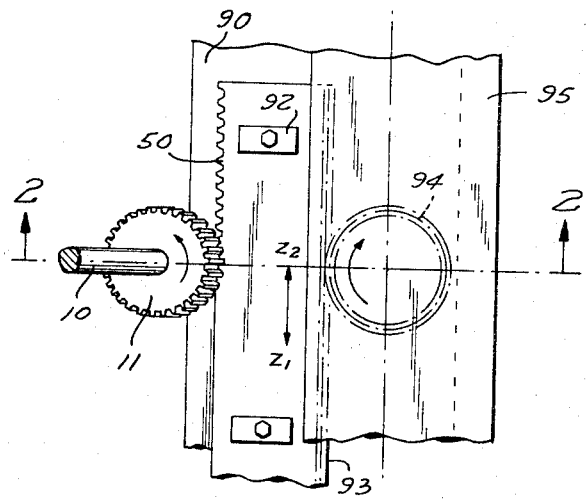
FIG. 3 is a fragmentary plan view illustrating a part of FIG. 2.

Referring now to the drawings, and more particularly to FIGS. 1, 2 and 3, a base housing portion 4 has a horizontal top face on which two parallel guide members 5 are mounted for guiding a pair of slides 8 and 8a toward and away from each other in the direction of the arrows 6, 7. An upright housing portion 1 projects from the rear portion of housing portion 4, and has at the top end a forwardly projecting housing part 1a which is located above the top face of the base housing portion 4. Two vertical guide members 2 are secured to the front face of the upright housing portion 1, and support a slide 3 for vertical reciprocating movement in the direction of the arrows $y_1$ and $y_2$. Slide 3 rotatably supports shaft 10 of a rotary cutter 11 which has the form of a cylindrical gear with dished concave end faces. The teeth of cutter gear 11 may be straight or helical. The concave end faces of the rotary cutter gear 11 form cutting surfaces along the ends of the teeth of the cutter gear. Shaft 10 is also supported in bearings in housing part 1a, and carries a fixed worm gear 33 which meshes with a worm driven through a transmission by an electric motor mounted in the lower part of the upright housing portion 1. The same motor, not shown, is connected by transmission means in base housing portion 4 to carriages 8 and 8a for moving the same toward and away from each other in the direction of the arrows 6, 7 for placing slides 8 and 8a in a desired position on opposite sides of cutter 11.

The above described construction is disclosed in detail in the U.S. Patent 3,089,392.

Slide 8 carries a body 91 provided with an undercut guideway 91' in which a carriage 90 is mounted for horizontal movement in the direction of the arrows $z_1$ and $z_2$ in FIG. 3. Carriage 90 has a holding member 92 operated by a screw to clamp a rackbar blank 50 which also extends in the direction of arrows $z_1$ and $z_2$. A top plate 92 closes a cavity formed by slide 91 and carriage 90 and permits sliding movement of carriage 90.

A shaft 28 is mounted in a bearing of slide 91 and carries a gear 94 meshing with the rackbar 93 secured to carriage 90 and extending also in the direction $z_1$, $z_2$. The lower end of the vertical shaft 28 carries a worm gear 97 meshing with a worm 98 which is slidable along a grooved shaft 25 in the direction of the arrows 6, 7 so that meshing engagement between gear 94 and rackbar 93 is maintained while slide 8 moves along guide members 5.

On the other side of rotary cutter 11, an exactly corresponding device is provided, like elements being indicated by the same reference numerals with the subscript a. Consequently, two rackbar blanks 50 and 50a are located on opposite sides of cutter 11, but it will be understood that one of the devices may be omitted, or rendered inoperative by placing it in a position spaced from the cutter.

From the above description, it will become apparent that carriages 90 and 90a are support members of first supporting means which are movable in a horizontal plane in a first direction indicated by arrows $z_1$, $z_2$, and that slide 3 is a second supporting means movable in a vertical second direction perpendicular to the first direction and indicated by arrows $y_1$, $y_2$. Rotary cutter means 10, 11, 33 are movable in a third direction indicated by arrows $x_1$, $x_2$ which is also the direction of the axis of shaft 10 and extends at an acute angle to the vertical second direction indicated by arrows $y_1$, $y_2$.

Figure 4:
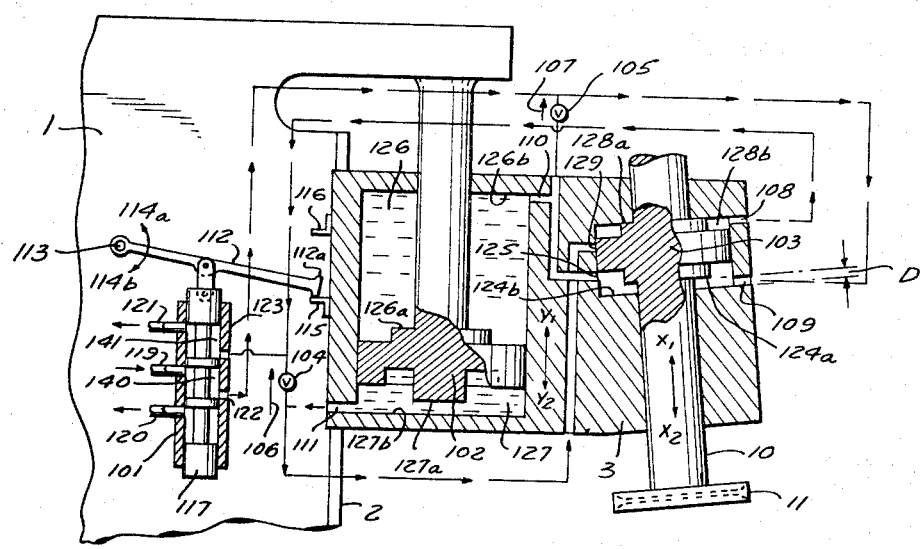
FIG. 4 is a vertical sectional view illustrating hydraulic operation control means for the embodiment of FIG. 1 and including a schematic diagram.

Hydraulic operation control means for moving the second supporting means 3 relative to the first supporting means 90, 90a, and for moving rotary cutter means 33, 10, 11 in the direction $x_1$, $x_2$ relative to first supporting means 90, 90a and second supporting means 3, are illustrated in FIG. 4 which is a diagrammatic developed sectional view taken along two perpendicular planes in the region of the upper part of housing portion 1 and of slide 3.

A valve 101 is located in housing portion 1 and includes an axially movable valve piston 117. The casing of valve 101 has an oil inlet 119 through which oil is fed under pressure by a pump, not shown. The casing has two oil outlets 120 and 121, and two openings 122 and 123 which, depending on the position of valve piston 117, may serve as an oil inlet from the pump to chambers 124, 125, 126 and as an oil outlet from chambers 127, 128, or alternately as an oil outlet from chambers 124, 125, 126 and as an oil inlet to chambers 128, 127.

Valve piston 117 is pivotally connected and controlled by a lever 112 which is mounted for angular movement on a pivot 113 and is turnable in opposite directions as indicated by arrows 114a and 114b.

Control lever 112 cooperates with a pair of stops 115 and 116 which are secured to the movable slide 3, and which are adjustable to different positions. Reversing of the movement of slide 3 in the direction $y_1$, $y_2$ is effected when one of the stops 115 or 116 abuts the end portion 112a of control lever 12 during the movement of slide 3 in the direction $y_1$, $y_2$ with the rotary cutter means 10, 11.

FIG. 4 illustrates slide 3 and rotary cutter means 10, 11 at the end of the upward reciprocating stroke in the direction of the arrow $y_1$. A downward stroke in the direction of the arrow $y_2$ is to begin.

As shown by the arrows, oil enters through pipe 119 into the annular chamber 140 and leaves through outlet 122 passing through a conduit and passage 109 into an annular chamber 124 which is part of a cylindrical chamber receiving a piston 103 secured to shaft 10 of cutter 11. Oil passes from chamber 124 to annular chamber 126 through passages 125 and 110. As indicated by the arrows, the oil flows from chamber 127, which is the lower part of the cylinder chamber in slide 3, out of passage 111, through valve 104 into chamber 141 through passage 123 and is discharged through pipe 121. As also indicated by arrows, the oil is discharged from chamber 128 through a passage 108, passage 123, chamber 141 and pipe 121.

Stop 115 abuts end 112a of lever 112 and as a result of the movement of slide 3 in the direction of the arrow $y_1$ due to the oil pressure exerted on face 126a of piston 102 within chamber 126, lever 112 will be raised. Piston 102 is fixedly secured to the top of housing portion 1, so that slide 3 is raised when oil flows into cylinder chamber 126, and is lowered when oil flows into cylinder chamber 127.

When lever 112 is raised in the direction of the arrow 114a by slide 3 and stop 115 arriving in the highest position, valve piston 117 is displaced and the oil flows into passage 123 and inlet 108 into chamber 128, displacing piston 103 with shaft 10 and cutter 11 a distance D, until the face 124a of piston 103 abuts the face 124b of the cylinder chamber in slide 3. During the downward travel of the rotary cutter means 10, 11 with piston 103, the latter opens a passage 129 through which oil can enter chamber 127 after having passed through passage 111. The oil flows from chamber 124 through passage 109 and is dicharged through passage 122, valve 101 and pipe 120. The oil passes from chamber 126 through passage 110, through valve 105, and is discharged through passage 122, chamber 141a, valve 101 and pipe 120.

In order to move slide 3 downward in the direction of the arrow $y_2$, oil pressure is exerted on faces 127a and 127b. When stop 116 abuts the end portion 112a of lever 112, piston 117 is displaced, and the reversed movement is initiated.

Stop 116 causes lever 112 to move in the direction of the arrow 114b so that piston 117 is displaced, permitting the oil to leave chamber 140 through passage 122. The oil flowing through passage 122 reaches passage 109 and enters chamber 124, thus initiating the retraction of the rotary cutter means 10, 11 by piston 103 in the direction $x_1$. Oil pressure on faces 124a and 124 cause piston 103 to rise until its face 128a abuts face 128b, so that oil can now enter chamber 126 through passages 125 and 110, starting the upward movement of slide 3 in the direction of the arrow $y_1$ together with the rotary cutter means 10, 11 carried thereby.

Oil from chamber 128 passes into passage 108 and is discharged through passage 123, chamber 141, and pipe 121. Oil flows from chamber 127 into passage 111, through valve 104, passage 123 and is discharged through chamber 141 and pipe 121.

It will be seen that the above described hydraulic operation control means causes movements of slide 3 with the rotary cutter means 10, 11 in the direction $y_1$, $y_2$ in a predetermined sequence with movements of the rotary cutter means 10, 11 in the direction $x_1$, $x_2$ which defines an acute angle with the direction $y_1$, $y_2$.

Figure 5:
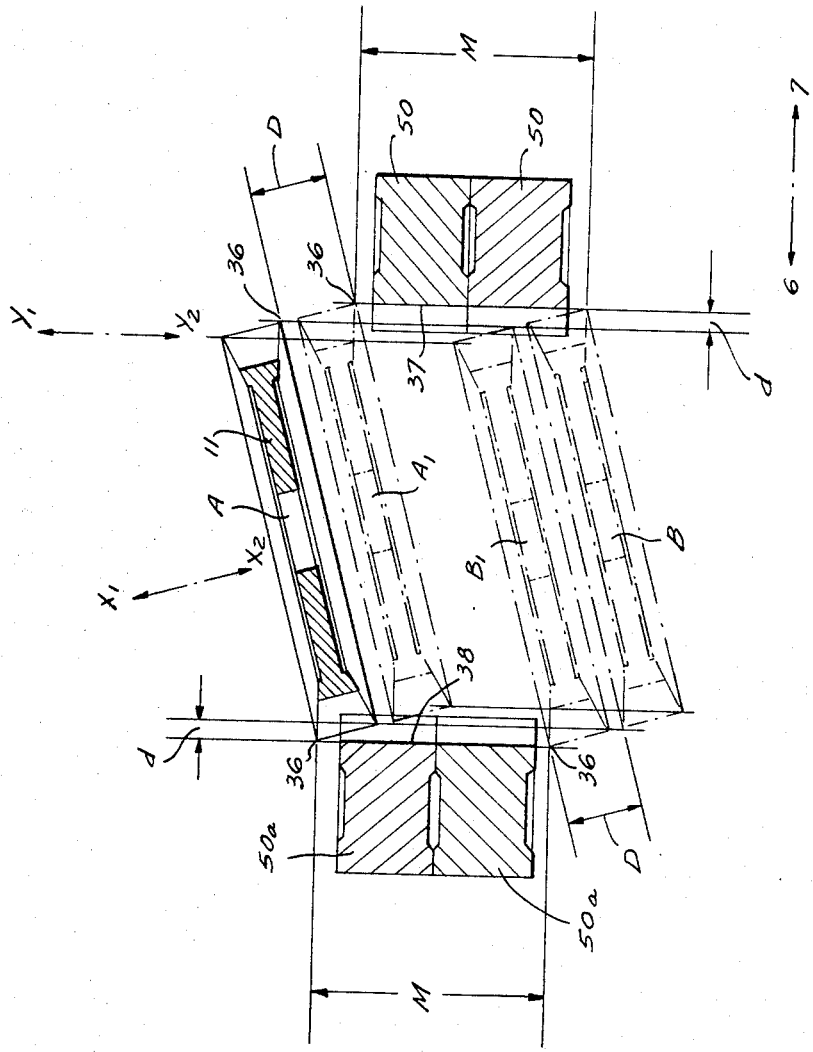
FIG. 5 is a vertical schematic sectional view illustrating sequential positions of the cutter of the machine of FIG. 1.

The sequential operations of cutter 111 will be best understood with reference to FIG. 5, which shows two superimposed rackbar blanks 50 and two superimposed rackbar blanks 50a located on opposite sides of cutter 11. It will be understood that holding means 92, 92a can be adjusted to hold more than one rackbar blank in superimposed positions. Blanks 50a are located higher than blanks 50 to shorten the vertical strokes of cutter 11.

During each cutting cycle, cutter 11 successively assumes four positions A, $A_1$, B, $B_1$. In the initial position A, the cutting edge 36 of cutter 11 is spaced a distance $d$ from the bottom 37 of the grooves to be cut in rack-bars 50 which are fed to cutter 11 by slides 8, 8a. At the beginning of the operation, cutter 11 moves in the direction of the arrow $x_2$ a distance D until arriving in the position $A_1$ in which cutting edge 36 touches the bottom of the already cut groove in the rackbar blanks 50. At this moment, the stroke D of cutter 11 in the direction $x_2$ ends, and a downward cutting stroke M in the direction $y_2$ under control of slide 3 starts. Cutting edge 36 cut rackbars 50, which are simultaneously moved in the direction $z_2$ to permit meshing between the rotating cutter gear 11 and rackbar blanks 50.

When slide 3 arrives in its lowest position, cutter 11 is in the position B. Thereupon cutter 11 is retracted by piston 103 in the direction of the arrow $x_1$, while slide 3 does not move. Consequently, cutter 11 arrives in the position $B_1$ after moving a distance D. In this position, the cutting portion of cutting edge 36 is again spaced the distance $d$ from the bottom land 37 of rackbars 50. However, a diametrically opposite portion of cutting edge 36' is now located in the region of the bottom land 38 of grooves in rackbar blanks 50a.

Slide 3 now starts its upward movement in the direction of arrow $y_1$ together with rotary cutter means 10, 11. Rack bar blanks 50a are cut while cutter 11 moves again the distance M back to its initial position. Carriage 90a is driven in the direction $z_1$, see FIG. 3, to permit meshing of rackbar blanks 50a with cutter 11 during movement from the position $B_1$ to the position A.

The cycle is repeated as many times as required until all rackbar teeth are generated to the desired depth. When cutter 11 is in the position A, releasing all rackbar blanks, slides 8 and 8a are moved in the direction of arrows 6, 7 towards each other to place cutting edges 36 of cutter 11 in the correct position in relation to rackbar blanks 50 and 50a, and this position is maintained during the following four stroke cycle.

It will be seen that cutter 11 moves during each cycle relative to the rackbar blanks along a parallelogram. Two opposite sides of the parallelogram have the length M and extend in the direction $y_1$, $y_2$, and the other two opposite sides the parallelogram extend in the direction $x_1$, $x_2$ inclined at an acute angle to the direction $y_1$, $y_2$. In accordance with the preferred embodiment of the invention, both strokes of the cutter in direction $y_1$, $y_2$ are used for cutting rackbar blanks, but if rackbar blanks 50a are omitted, rackbar blanks 50 will be cut in the same manner by a cutting stroke extending along one side of the parallelogram. However, by providing rackbar blanks on opposite sides of the cutter, the output of the machine is doubled.

It will be understood that each of the elements described above, or two or more together, may also find a useful application in other types of rackbar cutting machines, differing from the types described above.

While the invention has been illustrated and described as embodied in a rotary cutter moving along a path having the shape of a parallelogram for cutting rackbars, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A rackbar cutting machine, comprising, in combination, first supporting means and second supporting means movable relative to each other in a first direction and in a second direction perpendicular to said first direction; holding means mounted on said first supporting means for holding at least one rackbar blank extending in said first direction; rotary cutter means mounted on said second supporting means for rotation about an axis of rotation located in a plane perpendicular to said first direction and extending in a third direction at an acute angle to said second direction, said rotary cutter means having a cutting position meshing with said rackbar blank; and operation control means for first advancing said rotary cutter means in said third direction from an initial position to said cutting position, for then moving said first and second supporting means relative to each other in said second direction in a cutting stroke while moving the same relative to each other in said first direction with said rotary cutter means and said rackbar blank meshing, for then retracting said rotary cutter gear means in said third direction from said cutting position, and for then moving said first and second supporting means relative to each other in said second direction back to said initial position so that said rotary cutter means and said rackbar blank perform a relative movement along a parallelogram.

2. A rackbar cutting machine according to claim 1 wherein said first supporting means are movable with said holding means and rackbar blank in said first direction, wherein said second supporting means are reciprocable with said rotary cutter means in said second direction, and wherein said rotary cutter means is mounted on said second supporting means reciprocable in said third direction, and movable with the same in said second direction.

3. A rackbar cutting machine according to claim 1 wherein said first supporting means include a carriage; including slide means supporting said carriage for movement in said first direction; a rackbar secured to said carriage and extending in said first direction; and wherein said operation control means include a drive gear mounted on said slide means for rotation about an axis and meshing with said rackbar for moving said carriage and said rackbar blank in said first direction.

4. A rackbar cutting machine according to claim 3 wherein said second supporting means are reciprocable with said rotary cutter means in said second direction, and wherein said rotary cutter means is mounted on said second supporting means reciprocable in said third direction, and movable with the same in said second direction.

5. A rackbar cutting machine according to claim 1 wherein said rotary cutter means is a cylindrical cutter having teeth, and wherein said acute angle is selected to provide a corresponding clearance angle between said teeth and the recess cut by the same in said rackbar blank.

6. A rackbar cutting machine according to claim 1 wherein said first supporting means include two supporting members located on opposite sides of said rotary cutter means; wherein said holding means include two holding members respectively mounted on said supporting members for holding at least two rackbar blanks extending in said first direction parallel to each other on opposite sides of said cutter means; and wherein said rotary cutter means performs said cutting stroke on one of said rackbar blanks in said cutting position, and performs another cutting stroke on the other rackbar blank while said first and second supporting means move relative to each other in said second direction back to said initial position so that two opposite sides of said parallelogram are used for two cutting strokes, and the other two opposite sides are used for moving said rotary cutter means to and from said cutting positions.

7. A rackbar cutting machine according to claim 6 wherein said rotary cutter means is a cylindrical cutter having peripheral teeth and cutting portions at the axial ends thereof, and wherein one of said cutting portions cuts one of said rackbar blanks during one cutting stroke, and the other cutting portion cuts the other rackbar blank during the other opposite cutting stroke in said second direction, said acute angle being selected to provide corresponding clearance angles between said teeth and said recesses cut by the ends of said teeth in said rackbar blanks, respectively.

8. A rackbar cutting machine according to claim 6 wherein said members with said holding members and said rackbar blanks are together movable in said first direction, wherein said second supporting means are reciprocable with said rotary cutter means in said second direction, and wherein said rotary cutter means is mounted on said second supporting means reciprocable in said third direction, and movable with the same in said second direction.

9. A rackbar cutting machine according to claim 6 wherein said supporting members are carriages; including slide means supporting said carriages for movement in said first direction along parallel paths, each carriage including a rackbar extending in said first direction; and wherein said operation control means include two drive gears mounted on said slide means for rotation about two axes and respectively meshing with said rackbars for moving said carriages and said rackbar blanks in opposite directions along said parallel paths.

10. A rackbar cutting machine according to claim 9 wherein said second supporting means are reciprocable with said rotary cutter means in said second direction, and wherein said rotary cutter means is mounted on said second supporting means reciprocable in said third direction, and movable with the same in said second direction.

No references cited.

WILLIAM W. DYER, Jr., *Primary Examiner.*

L. VLACHOS, *Assistant Examiner.*